United States Patent
Gavrun

[15] 3,696,796
[45] Oct. 10, 1972

[54] FUEL COMBUSTION IN A ROTARY PISTON INTERNAL COMBUSTION ENGINE

[72] Inventor: Michael T. Gavrun, Bayonne, N.J.
[73] Assignee: Curtiss-Wright Corporation
[22] Filed: Feb. 26, 1971
[21] Appl. No.: 119,132

[52] U.S. Cl. ................. 123/8.01, 123/8.09, 418/61
[51] Int. Cl. ............................................ F02b 53/00
[58] Field of Search .............. 123/8.01, 8.09; 418/61

[56] References Cited

UNITED STATES PATENTS 3,606,602   9/1971   Hamada et al ............... 418/61

Primary Examiner—C. J. Husar
Attorney—Arthur Frederick and Victor D. Behn

[57] ABSTRACT

In a rotary piston internal combustion engine, a rotor having in each peripheral surface thereof a recess or pocket comprising a relatively large and deep depression and at least one relatively narrow and shallow channel communicating with and extending from the deep depression in the direction of rotor rotation. The channel defining, in the "waist" area of the engine housing, a "shooting" passageway which propels gaseous fluid in the working chamber at high velocity into the expansion working chamber for additional fuel combustion therein. The relatively large and deep recess provides, as the rotor rotates, high turbulence, residence time and volumetric space for mixing and flame propagation from the point of ignition.

10 Claims, 9 Drawing Figures

INVENTOR.
Michael T. Gavrun
BY
Arthur Sedwick
ATTORNEY

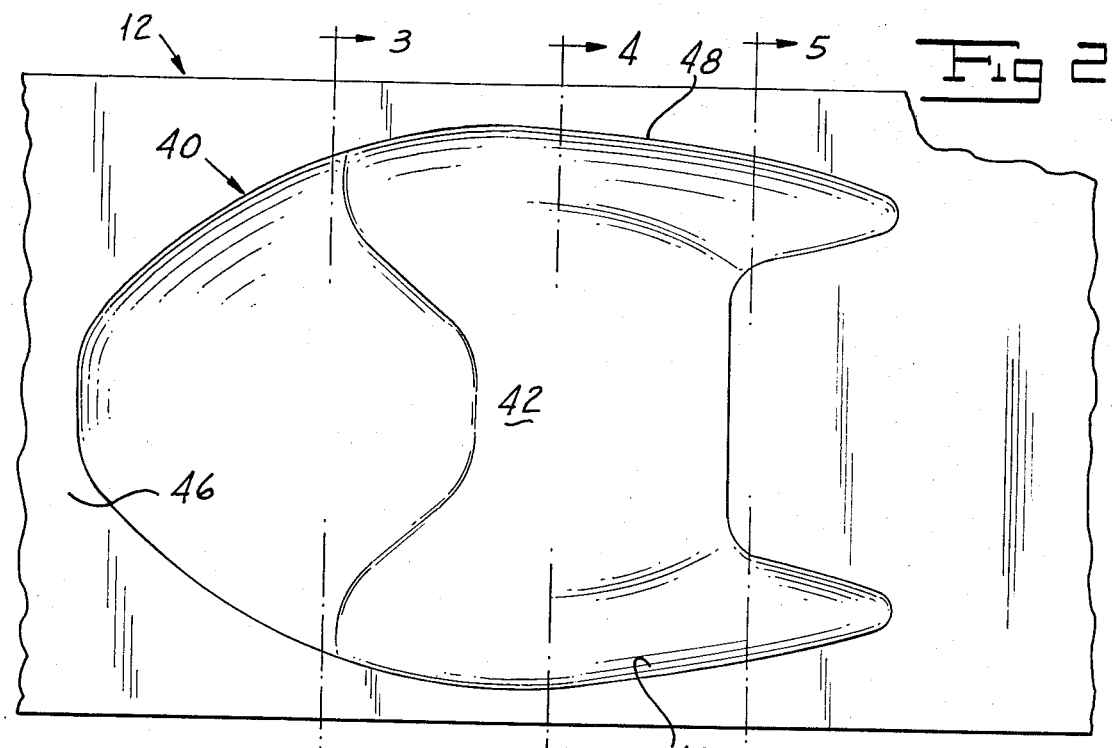
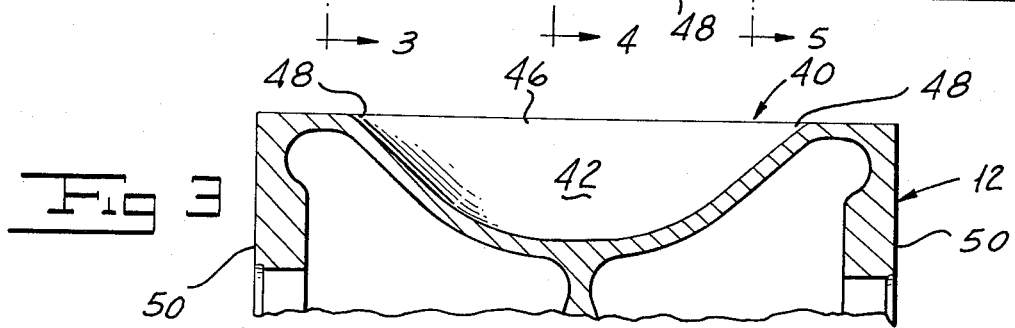
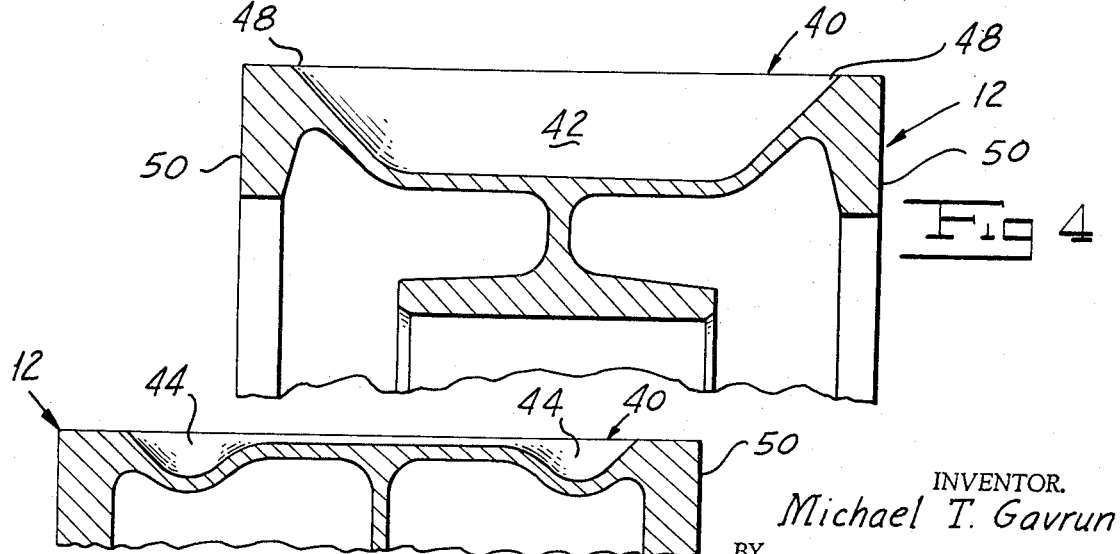
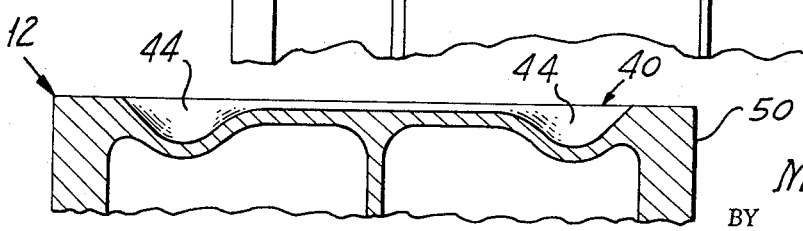

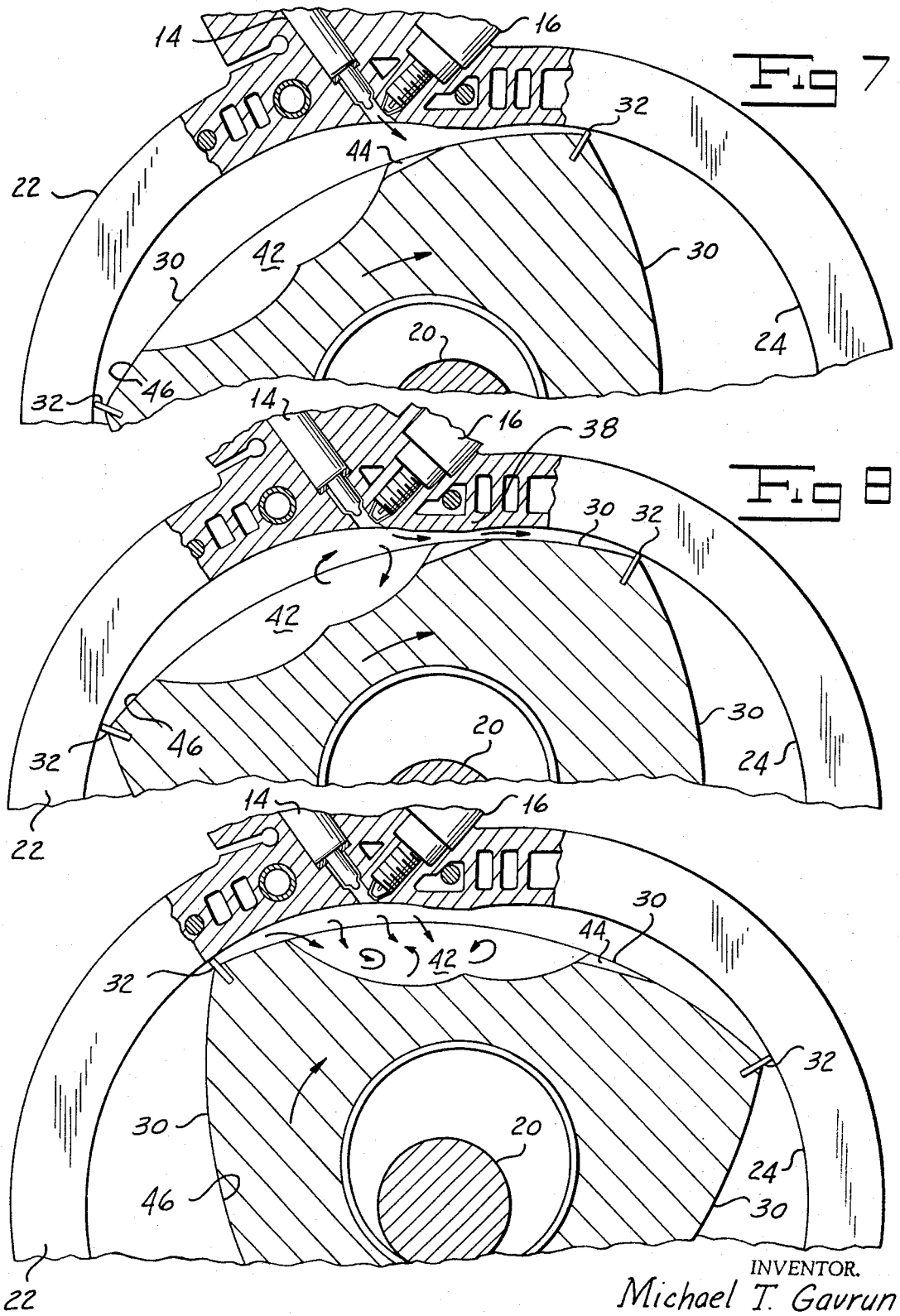

FUEL COMBUSTION IN A ROTARY PISTON INTERNAL COMBUSTION ENGINE

DISCLOSURE OF INVENTION

This invention relates to rotary piston, internal combustion engines of type shown, for example, in U.S. Pat. No. 2,988,065 which issued to Felix Wankel et al. More particularly, the invention is directed to means for providing in the engines of the aforesaid type improved combustion of fuel.

Since the invention of the rotary piston, internal combustion engine, there has been a continual effort exerted by the industry to improve the efficiency of fuel combustion in the working chambers of the engine. These efforts have been directed to the placement of fuel injection nozzles and/or spark plugs relative to the top dead center of the rotary housing, the timing of fuel injection and/or ignition, and the contour of the working chambers as are exemplified in the following U.S. Pats. Nos.:

Wolf-Dieter Bensinger et al. 3,446,190
Lamm et al. 3,398,724
Jones 3,393,667
Turner 3,359,955
Hamada 3,249,095
Bentele 3,246,636
Froede et al. 3,245,388
Liebel 3,292,600
Bentele 3,196,852

The need for improving fuel combustion in rotary piston, internal combustion engines has become increasingly important as the need for reducing atmospheric pollution has increased. This aim for complete fuel combustion in rotary piston internal combustion engines poses unique problems arising from the angular speed of the rotor, whether the combustion system is of the fuel injection-spark ignition, carburetion or diesel type. To provide the proper mixture of fuel and air for substantially complete burning of the fuel, the proper distribution of fuel in relation to the air volume distribution in the working chamber is an important factor. This relationship is dependent upon the velocities and direction of gaseous fluid movement within the chamber before and during fuel combustion. The velocities and direction of gaseous fluid to provide proper intermixing of air and fuel is, in part, dependent upon the dimensions and the contour of the recess or pocket in the peripheral surfaces of the rotary piston. In fuel injection-ignition type systems or "stratified charge" systems such as disclosed in the U.S. Pats. Nos. to Bentele, 3,246,636 and Jones, 3,393,667 wherein fuel injection is controlled to effect a burning of fuel in a localized area around the ignition means, proper fuel distribution and mixing of fuel and air in the working chamber for efficient fuel combustion has been particularly difficult to attain. One reason for such difficulty is that at approximately 60° before top dead center, at which point fuel injection desirably commences, about 5 percent to about 10 percent of the combustion chamber volume has passed beyond the plane of fuel injection and, therefore, the more or less stagnant gaseous fluid (a lean fuel-air mixture) does not participate in the combustion process.

Accordingly, it is an object of this invention to provide in a rotary piston, internal combustion engine, a rotary piston or rotor which coacts with the trochoidal surface of the engine housing to affect more efficient burning of fuel in the working chambers.

Another object of the present invention is to provide working chambers in a rotary piston, internal combustion engine of such configuration that fuel combustion occurs with substantial reduction in the amount of unburned hydrocarbons in the exhaust gases as compared with heretofore known rotary combustion engines.

A further object of this invention is to provide a rotary piston of a rotary piston, internal combustion engine which coacts with the trochoidal surface of the engine housing to affect a thorough mixing of fuel and air.

SUMMARY OF THE INVENTION

The present invention contemplates in a rotary piston, internal combustion engine a novel rotor having a recess or pocket of unique configuration in each of the arcuate, peripheral surfaces of the rotor. Each of the rotor pockets comprises a relatively large and deep recess and at least one relatively shallow, narrow channel communicating at one end with the deep recess and extending ahead of the latter with respect to the direction of rotation of the rotor. This shallow, narrow channel defines, in the area of the "waist" portion of the trochoid surface a "shooting" passageway which causes the gaseous fluid to pass therethrough into the expansion-working chamber at high velocity and thus mix with a relatively stagnant volume of gaseous fluid and thereby promoting more rapid flame propagation. Also, the relatively large and deep recess provides, as the rotary piston rotates, a high degree of turbulence, residence time, and volumetric space for mixing and flame propagation from the point of ignition. The trailing portion of the pocket is tapered so that gaseous fluid trapped between the trailing apex seal of the rotor, the trailing flank of the rotor (rotor surface behind the pocket) and the housing, is subjected to diesel-like "squish" and propelled at high velocity into the pocket to create high turbulence therein to ensure a proper mixture of fuel and air for efficient combustion.

In the application of this invention to a rotor of a "stratified charge" type rotary piston internal combustion engine, at least a portion of the stream of fuel is injected in a direction toward and into the "shooting" passageway. This causes such fuel to be propelled under high velocity into the expansion working chamber so as to mix with a substantial portion of the 5 percent to 10 percent of the more or less stagnant gaseous fluid (a lean fuel-air mixture) which has passed beyond the point of fuel injection. This recovers some of the gaseous fluid, such as air, which would be expelled by mixing with and burning the fuel. The trailing flank portion of the rotor, that is, the portion rearwardly of the heel of the pocket relative to the direction of rotor rotation, provides an effective diesel-like compression of air trapped between the rotor and housing and thereby causes air to be propelled at high velocity, from the periphery of the pocket, into the pocket and thus create a zone of high turbulence or agitation in which air and fuel are thoroughly mixed and burned.

BRIEF DESCRIPTION OF THE DRAWINGS

The invention will be more fully understood from the following description when considered in connection with the accompanying drawings in which:

FIG. 2 is a fragmentary plan view of the rotary piston in FIG. 1 showing the pocket according to this invention;

FIG. 3, 4 and 5 are cross-sectional views taken along lines 3—3, 4—4 and 5—5 of FIG. 2;

FIG. 7 is a diagrammatic view of a rotary piston shown in FIG. 1 at about 60° before top dead center at which point fuel injection may occur;

FIG. 8 is a diagrammatic view similar to FIG. 7 showing another position of the rotary piston; and FIG. 9 is a schematic view, similar to FIGS. 7 and 8, showing a still more advanced position of the rotary piston showing the diesel compression effect of the rotary piston.

DESCRIPTION OF A PREFERRED EMBODIMENT

Figure 1:
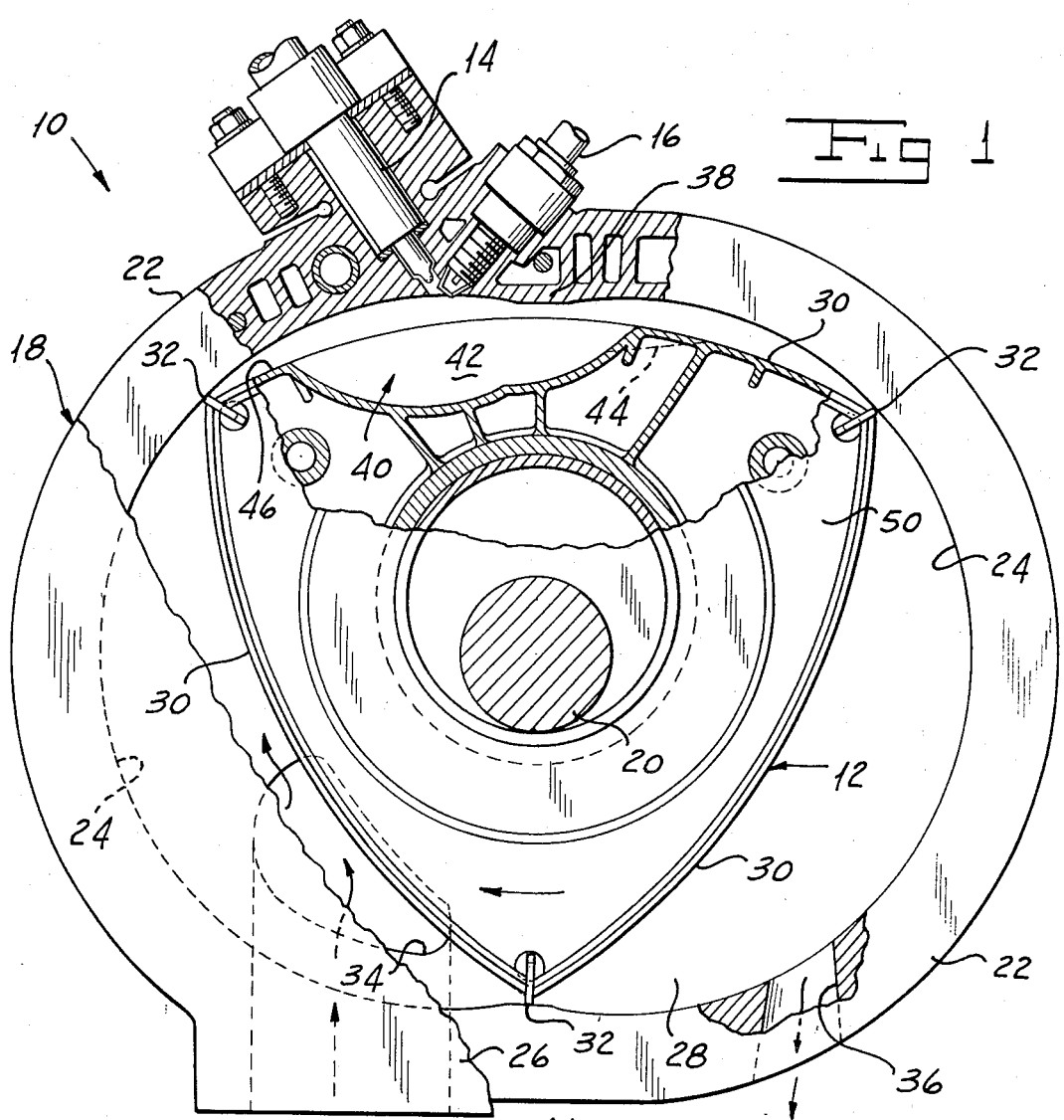
FIG. 1 is a transverse sectional view through a rotary piston internal combustion engine having a rotary piston according to this invention.

Now referring to the drawings and, more particularly FIG. 1, the reference number 10 generally designates a rotary piston, internal combustion engine having a rotary piston or rotor 12 according to this invention. The rotary combustion engine 10 is shown as a "stratified charge" type which has a fuel injection nozzle 14 and ignition means, such as a spark plug 16, located to direct fuel and ignite the same in the compression working chambers. While rotor 12 of this invention is shown and will be described as employed in a "stratified charge" engine, it is to be understood that the invention is not limited thereto but has application to rotary combustion engines of the type operating on carbureted liquid or gaseous fuel, liquid fuel injection at the air intake inlet or the like, without departure from the scope and spirit of this invention.

As shown in FIG. 1, rotary combustion engine 10 is of the type disclosed in the U.S. Pat. No. 3,246,636 to Bentele wherein a housing 18 defines a cavity in which rotor 12 is eccentrically supported for rotation and connected to drive an output shaft 20. The cavity is formed by a housing body portion 22 having an inner surface 24 of epitrochoidal configuration and two end walls 26 and 28 secured to opposite sides of body portion 22 in any suitable manner well known to those skilled in the art, such as tie-bolts (not shown). The rotor 12 has the shape somewhat like that of a Reuleaux triangle so that it has three arcuate shaped peripheral surfaces 30 meeting at apex portions in which are mounted seals 32. Each arcuate peripheral surface 30 defines with the trochoid surface 24 working chambers which vary in volumetric size as rotor 12 rotates. An air intake port 34 is provided in end wall 28 to communicate with the working combustion chambers to conduct air into the chambers while an outlet or exhaust port 36 is formed in body portion 22 through which combustion gases are expelled from the working chambers. As is well known in the art, intake port 34 can be located in body portion 22 or end wall 26 while exhaust port 36 may be positioned in either end walls 26 or 28 instead of in body portion 22.

The fuel injector nozzle 14 and ignition means 16 are located in body portion 22 on the intake side of the waist or lobe junction 38 of trochoid surface 24. The exact position of the nozzle from lobe 38 is determined by the geometry of the engine and other factors such as optimum fuel distribution or mixing. It has been found preferable, in an air cooled engine having 90 cubic inch working chambers, to locate the injector nozzle 2.13 inches from lobe junction 38 or top dead center of the housing and thereby avoid excess heat flux buildup. Of course, as disclosed in the patents to Bentele, U.S. Pat. Nos. 3,246,636, and 3,196,852, suitable means (not shown) is provided for coordinating fuel injection and ignition in relation to rotation of rotor 12.

As best shown in FIGS. 2 to 6, each of the peripheral surfaces 30 of rotor 12 is provided with a recess or pocket 40 according to this invention. The pocket 40 comprises a relatively wide and deep depression 42 and preferably two laterally spaced, relatively shallow, narrow channels 44 communicating with and extending from depression 42 in the direction of rotation of rotor 12. Each of the channels 44 are preferably formed to taper in width inwardly from its point of juncture with depression 42 to its point of termination as well as having the bottom extending at an incline in the same direction upwardly to the rotor surface 30. The heel or trailing end of pocket 40 is in close spaced relation to the seal 32 at the trailing end of the associated surface 30, to provide a diesel-like "squish" surface 46, the function of which will be more fully explained hereinafter. The pocket 40 is dimensioned so that the lateral edges 48 extend in close spaced relationship with end faces 50 of rotor 12.

The effect of pocket 40 in producing improved combustion of fuel over heretofore known rotors and the working chamber geometry, is illustrated in FIGS. 6 to 9. In FIG. 7, rotor 12 is shown at a point before top dead center, as for example at about 60°, at which point fuel is injected through nozzle 14 into the compression working chamber past spark plug 16 which has an electric arc jumping its electrodes to ignite some of the fuel being sprayed past the spark plug. As the rotor 12 moves to the position illustrated in FIG. 8, channels 44 are adjacent lobe junction 38 and the air in the working chamber is compressed with a resulting increase in fluid pressure, further pressure increase being caused by the burning of the fuel. Each of the channels 44 as it moves relative to lobe 38 defines with the latter "shooting" passages through which the pressurized fuel and air are forced at high velocities into the expansion-working chamber in advance of the compression-working chamber relative to the direction of rotor rotation (the area to the right of lobe 38 as viewed in FIGS. 7–9). These two high velocity streams of fuel and air passing into the expansion chamber (see also FIG. 6) achieves, in effect, a recovery of air which has passed into the expansion working chamber before fuel injection by causing it to mix with fuel and, hence, burn the latter which otherwise would remain unburned.

Figure 6:
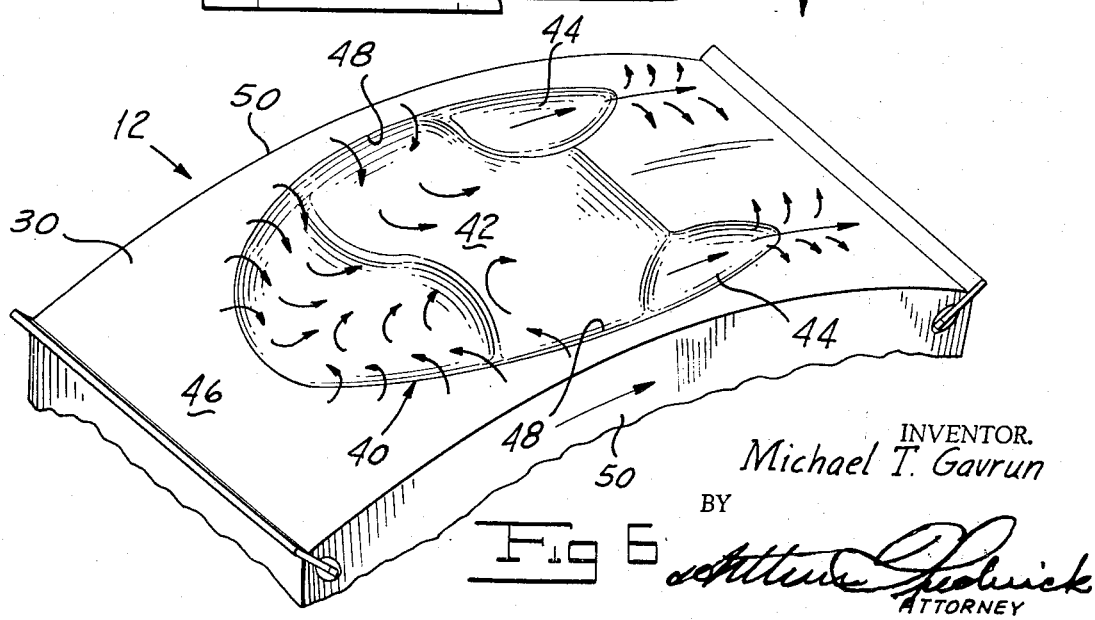
FIG. 6 is a view in perspective of the rotary piston of this invention.

As is illustrated in FIGS. 6 and 9 with the rotation of rotor 12, the volumetric size of compression working chamber diminishes and the trapped air is forced or pumped, from the peripheral surfaces of rotor surface 30 surrounding depression 42, into the depression at very high velocity creating a high degree of turbulence within the working chamber. This turbulence effects an improved mixing of air and fuel than in other heretofore known rotor configurations so that burning of fuel is more complete and the carryover of unburned hydrocarbons to exhaust port 36 is minimized. Also, improved burning of fuel occurs because depression 42 provides, by reason of its relatively large dimensions in width and depth, sufficient space and time as the rotor rotates for flame propagation away from the point of ignition. This also contributes to minimization of hydrocarbon carryover to exhaust. The turbulence of gaseous fluid within the working chamber continues into the expansion working chamber, as shown in FIG. 9, to effect burning of fuel which may have escaped ignition. At this point there is no fuel injection, fuel injection has preferably stopped between about 10° and about 20° after top dead center.

While the invention has been described as providing improved combustion of fuel in a "stratified charge" type rotary piston engine, superior combustion is also achieved in engines where fuel is entrained in the air passing through inlet port 34 into the working chambers because thorough mixing of the air and fuel is achieved by the increased turbulence brought about by the high velocity pumping of gaseous fluid into the pocket 40 and the width and depth of the pocket which provides time for substantial flame propagation from the point of ignition. In addition, improved combustion is obtained by reason of channels 44 which, through a "flame thrower" effect, causes rapid advancement of the combustion flame into the volume of stagnant fuel and air in the expansion working chamber of the engine.

Furthermore, it is to be understood that it is within the purview of the present invention to employ only one channel 44 instead of two where the engine working chambers are relatively narrow or more than two when the engine working chambers are relatively wide. For example, two channels 44 as shown and described herein for a 90 cubic inch displacement engine while one would be satisfactory for a 60 cubic inch displacement engine having the same size trochoid.

It is believed now readily apparent that the present invention provides for a rotary piston, internal combustion engine, an improved rotary piston which has pockets of a configuration and dimensions so that improved combustion of fuel occurs and, hence, carryover of unburned hydrocarbons in the exhaust gases is minimized.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A rotary piston for a rotary piston, internal combustion engine eccentrically mounted for rotation in a multi-lobe, trochoidal shaped engine housing and defining with the housing intake, compression, expansion and exhaust working chambers each of which vary in volumetric size as the rotary piston rotates within the housing in combination with ignition means for initiating fuel combustion disposed within the housing at a point relative to the direction of rotary piston rotation preceding the lobe junction between the compression and expansion combustion-working chambers, the rotary piston comprising:
   a. body portion having a plurality of contiguous peripheral surfaces which define with said housing said working chambers;
   b. a pocket in each of said peripheral surfaces; and
   c. each of said pockets comprising a relatively wide and deep depression and at least one channel substantially narrower and shallower than said depression and communicating with the depression and extending in a direction of piston rotation to a point spaced from the leading portion of the surface.

2. The piston of claim 1 wherein said narrow and shallow channel narrows in width from the depression in the direction of rotation and the bottom is inclined upwardly toward the associated peripheral surface in a direction away from said depression.

3. The piston of claim 1 wherein said depression narrows in width in a direction counter to the direction or rotor rotation.

4. The apparatus of claim 1 wherein said engine has a housing having an internal surface having a dual epitrochoidal configuration within which the piston rotates.

5. The apparatus of claim 1 wherein said piston is generally of triangular shape.

6. A rotary piston for a rotary piston, internal combustion engine eccentrically mounted for rotation in a multi-lobe, trochoidal shaped engine housing and defining with the housing intake, compression, expansion and exhaust working chambers each of which vary in volumetric size as the rotary piston rotates within the housing in combination with ignition means for initiating fuel combustion disposed in the housing at a point relative to the direction of rotary piston rotation preceding the lobe junction between the compression and expansion working chambers, the rotary piston comprising:
   a. a body portion having a plurality of contiguous peripheral surfaces which define with said housing said working chambers;
   b. each peripheral surface having a recess therein; and
   c. each recess comprises a relatively wide and deep depression and laterally spaced channels each of which is substantially narrower and shallower than said depression and in communication with the recess and extending in the direction of piston rotation to a point spaced from the leading portion of the associated surface.

7. The piston of claim 6 wherein each of the channels narrows in width from the depression in the direction of rotation and the bottom is inclined upwardly toward the associated surface in a direction away from said depression.

8. The piston of claim 7 wherein said recess narrows in width in a direction counter to the direction of rotor rotation.

9. A rotary piston for a rotary piston, internal combustion engine eccentrically mounted for rotation in a two-lobe, epitrochoidal shaped engine housing and defining with the housing intake, compression, expansion and exhaust working chambers each of which vary in volumetric size as the rotary piston rotates within the housing in combination with ignition means for initiating fuel combustion in the compression working chamber and located within the housing at a point relative to the rotary piston rotation preceding the lobe junction between the compression and expansion working chambers to initiate fuel combustion in the working chambers before the rotary piston reaches top dead center, said piston comprising:

a. body portion of generally triangular configuration having contiguous peripheral arcuate shaped surfaces which define with said housing said working chambers;

b. each peripheral surface has a recess therein spaced from the next adjacent apices of the body portion; and c. each recess comprises a relatively wide and deep depression and laterally spaced channels each of which is substantially narrower and shallower than said depression;

d. each of the narrow channels communicate at one end with the recess and extend in a direction of piston rotation in close spaced relation to the side edges of the associated peripheral surface to a point spaced from the leading apex portion of the piston.

10. The piston of claim 9 wherein each pair of channels narrow in width from the depression in the direction of rotation and the bottom is inclined upwardly toward the associated surface in a direction away from the recess.

* * * * *